United States Patent [19]

Omata et al.

[11] Patent Number: 5,269,992
[45] Date of Patent: Dec. 14, 1993

[54] METHOD OF MAKING A FEATHER CONTAINING RESILIENT BODY

[75] Inventors: Youichi Omata; Yoshiharu Ishikawa, both of Kanagawa, Japan

[73] Assignee: Ikeda Bussan Co., Ltd., Ayase, Japan

[21] Appl. No.: 961,176

[22] Filed: Oct. 15, 1992

[30] Foreign Application Priority Data

Oct. 18, 1991 [JP] Japan .................. 3-298157

[51] Int. Cl.⁵ .................................. B29C 67/24
[52] U.S. Cl. .................................... 264/109
[58] Field of Search ............... 264/109, 331.19

[56] References Cited

U.S. PATENT DOCUMENTS 2,512,007  6/1950  Benda .................. 264/112
2,720,909 10/1955  Ehrlich ................ 264/112
5,002,830  3/1991  Gillis et al. ......... 264/331.19

FOREIGN PATENT DOCUMENTS

13-27880 12/1938 Japan .

*Primary Examiner*—Mary Lynn Theisen
*Attorney, Agent, or Firm*—Foley & Lardner

[57] ABSTRACT

A method of producing a feather containing resilient body to be used for a padding or a trim cover of a vehicular seat. The method is as follows: First, a predetermined amount of feathers is coated with water and prepolymer of polyurethane resin. The coated feathers are put into a mold to form a mass of feathers. In the mold, the feather mass is adjusted in thickness and heated so that the polyurethane resin prepolymer is hardened.

8 Claims, 6 Drawing Sheets

METHOD OF MAKING A FEATHER CONTAINING RESILIENT BODY

BACKGROUND OF THE INVENTION

1. Field of the Invention

This invention relates to improvements in a method of producing a feather containing resilient body, and more particularly to such a method of producing a feather containing resilient body to be used for a trim cover or a padding of a seat of an automotive vehicle.

2. Description of the Prior Art

Seats of an automotive vehicle have been required to stably support vehicle occupants during a cruising of the vehicle and offer a suitable sitting comfortableness, and further to lighten a fatigue feeling of the vehicle occupants as much as possible even under the occupant's long time seating thereon. For these purposes, a variety of arrangements and materials have hitherto been proposed and put into practical use for a padding of the vehicular seats and for a trim cover which covers the padding.

Japanese Utility Model Publication No. 38-27880 shows a feather containing resilient body used for a cushion of beds and chairs. Additionally, it is well known that feather or plumage has been used in carpets, bedclothes and the like so as to offer a light and good-cushioning touch.

However, feather or plumage has not been used for the trim cover of the vehicular sheet and usually includes a surface layer and a wad layer securely attached to the back side surface of the surface layer. The wad layer is formed, for example, of polyurethane foam.

In order to employ the feather for the wad layer, the feather is required to packed in a bag, in which the feather moves in the bag to be localized and therefore it is difficult to maintain an uniformly distributed state of the feather within the bag. In view of this, the interior of the bag is divided upon sewing after the feather is supplied into the bag, which makes the sewing operation complicated and troublesome. Additionally, particularly in a vehicular seat, the trim cover of a seat cushion is formed inclined, and the trim cover of a seat back is formed generally vertical. Therefore, it is difficult to maintain the feather in a uniformly distributed condition, and there is a tendency that the feather within the seat cushion and back trim covers is localized under load of the vehicle occupant and during the occupant's getting on and off a vehicle. In view of this, it will be proposed to increase the amount of feather packed in the bag. However, this provides an uneven surface of the trim covers under a pattern sewing or the like and accordingly deteriorates the external appearance of the trim covers.

The feather containing resilient body disclosed in the above discussed Japanese Utility Model Publication No. 38-27880 is produced by lightly accumulating features one on another spraying adhesive material, so that the feathers are formed into a blocked state, forming clearances among the accumulated feathers. The thus produced block state feathers are excellent in air permeability but low in elasticity so that the block state feathers will be deformed or made into a collapsed condition under load. Additionally, accumulating the feathers spraying the adhesive material makes production operations remarkably complicated and troublesome.

SUMMARY OF THE INVENTION

It is an object of the present invention to provide an improved method of producing a feather containing resilient body which is high in elasticity, excellent in external appearance and touch, and remarkably improved in production operation efficiency.

Another object of the present invention is to provide an improved method of producing a feather containing resilient body which is light in weight and excellent in cushioning characteristics and has no fear of feathers being localized even upon repeated application of load onto the resilient body.

A further object of the present invention is to provide an improved method of producing a feather containing resilient body which is used as a padding or a trim cover of a vehicular seat, in which there is no possibility of feathers being localized even at vehicle occupant's seating and getting on and off a vehicle.

A method of producing a feather containing resilient body, according to the present invention comprises the following steps: (a) A predetermined amount of feather is uniformly coated with water. (b) The predetermined amount of feather is coated with prepolymer of polyurethane resin to form a mass of feather. (c) The thickness of the feather mass is adjusted. (d) The polyurethane resin prepolymer in the feather mass is hardened upon adjusting the thickness of the feather mass.

According to the above production method of the feather containing resilient body, the predetermined feather is uniformly coated with the polyurethane resin prepolymer and water, and therefore the hardening reaction of the polyurethane resin effectively proceeds in the presence of water thereby preventing the urethane resin prepolymer from being localized and from hardened upon being localized. Thus, the predetermined amount of feather is securely bonded with each other in a uniformly distributed state thereby obtaining the feather containing resilient body high in strength and excellent in cushioning characteristics. Additionally, since hardening of the polyurethane resin prepolymer is carried out after adjusting the thickness of the feather mass, the feather containing resilient body having a predetermined thickness can be easily and swiftly produced while largely improving production operational efficiency of the feather containing resilient body.

BRIEF DESCRIPTION OF THE DRAWINGS

In the drawings, like reference numerals designate like elements and parts throughout the figures, in which:

FIGS. 1A to 1F are schematic illustrations showing a first embodiment of a method of producing a feather containing resilient body, in accordance with the present invention, in which FIGS. 1A to 1C are schematic sectional views of a mixing device supplied with feathers, FIGS. 1D and 1E are schematic sectional views of a fabrication mold supplied with features, and FIG. 1F is a schematic sectional view of a trim cover;

FIGS. 7A to 7D are illustrations showing a process of forming a padding of a vehicular seat from the feather containing resilient body produced by the method of the present invention, in which FIG. 7A is a perspective view of a fabrication mold, FIG. 7B is a sectional view of the fabrication mold, FIG. 7C is a sectional view of the fabrication mold supplied with the resilient bodies.

DETAILED DESCRIPTION OF THE INVENTION

Referring now to FIGS. 1A to 1F of the drawings, a first embodiment of a method of producing a feather (plumage) containing resilient body, according to the present invention will be discussed. In this embodiment, the resilient body is used for a wad layer 3 of a trim cover 1 of a seat of an automotive vehicle. The trim cover 1 includes a surface layer 2 which is located on the surface side of the trim cover 1. The wad layer 3 is formed contacting with the back surface of the surface layer 2 and located on the back side of the surface layer 2. The trim cover 1 is covered on a padding (not shown) thereby to form the vehicular seat.

Figure 1A:
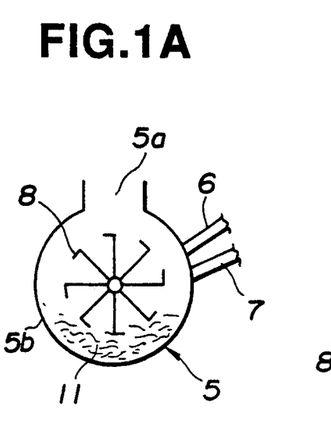
Figure 1B:
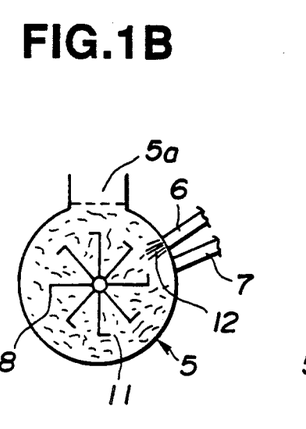
Figure 1C:
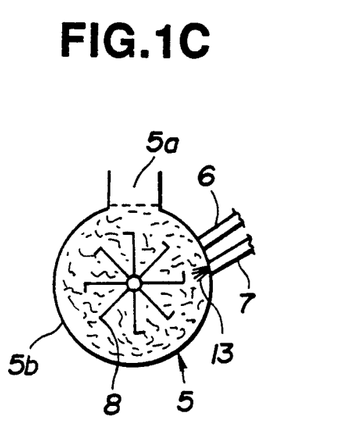

The feather containing resilient body 3 is produced by the following method or process: First, a predetermined amount of feathers or plumage 11 is supplied into the mixing vessel or tank 5b of a mixing device 5 through an inlet 5a. Subsequently, water is sprayed to the feathers 11 in the mixing vessel 5 from a water supply pipe 6 provided at one side of the mixing vessel 5 under a mixing or stirring condition in which stirring vanes 8 in the mixing vessel 5 are rotated, so that the feathers 11 are coated with water. Thereafter, prepolymer 13 of polyurethane resin is sprayed into the mixing vessel 5b through a resin supply pipe 7 under the mixing condition, so that the prepolymer 13 is applied onto the feathers 11 coated with water. Under this state, reaction of the prepolymer 13 proceeds upon addition of water 12 so that the prepolymer 13 functions as an adhesive, in which the prepolymer 13 is uniformly distributed onto the feathers 11 and not localized.

Figure 1D:
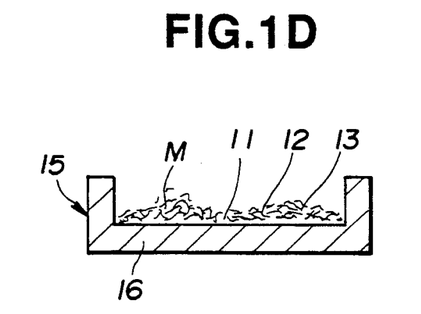
Figure 1E:
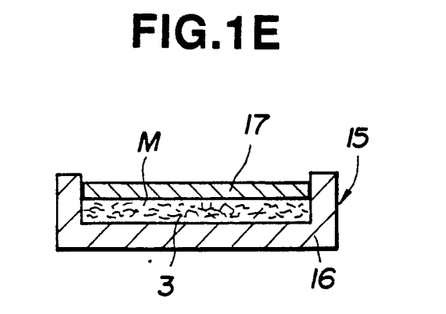
Figure 1F:
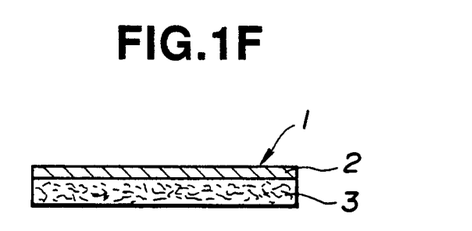

Next, the feathers 11 with the prepolymer 13 and water 12 in the mixing vessel 5 are uniformly poured into a lower mold 16 of a fabrication mold 15 to form a mass M of the feathers 11. Then, an upper mold 17 is put on the feather mass M, maintaining a predetermined distance between the lower surface of the upper mold 17 and the inner bottom surface of the lower mold 16 thereby adjusting the thickness of the feather mass M. The thus thickness-adjusted feather mass M is heated to remove water and harden the polyurethane resin prepolymer 13 thereby obtaining the feather containing resilient body 3.

While the prepolymer of polyurethane resin has been shown and described as being sprayed after spraying water, it will be understood that the prepolymer 13 may be sprayed simultaneously with or before spraying water.

An example of the feather containing resilient body 3 is formed using 100 g of the feather 11, 80 g of the polyurethane resin prepolymer 13, 80 g of water and voluntarily 1 g of a surface active agent. The resultant resilient body 2 has an apparent density of 350 g/m$^2$ and a thickness of 20 mm.

Although the feather containing resilient body 3 produced by this method has been shown and described as being used for the wad layer 3 of the vehicular seat trim cover 1, it will be understood that the feather containing resilient body 3 may be used as other materials such as a vehicular seat padding as discussed after.

Figure 2:
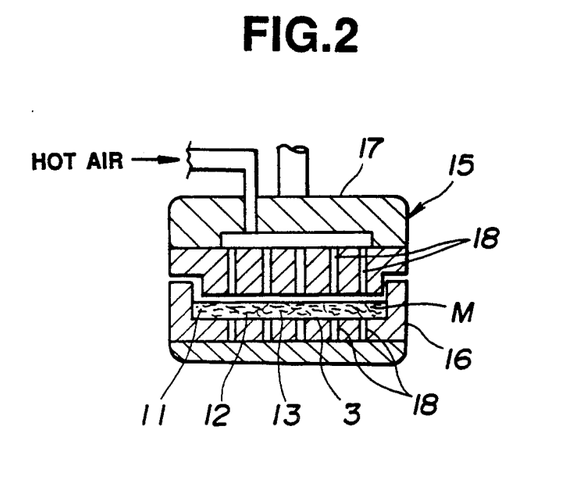
FIG. 2 is a vertical sectional view of a fabrication mold used in a second embodiment of the method of producing the feather containing resilient body, in accordance with the present invention.

FIG. 2 illustrates an essential part of a second embodiment of the producing method of the feather containing resilient body 3, in accordance with the present invention. This production method is similar to the first embodiment of FIGS. 1A to 1F except for the steps after the feathers 11 coated with water 12 and the prepolymer 13 is taken out from the mixing device 5. That is, the feathers 11 coated with the polyurethane resin prepolymer 13 and water 12 is taken out from the mixing vessel 5b and poured into the fabrication mold 15 to be located between the lower and upper molds 16, 17. In this fabrication mold 16, hot air circulation passages 18 are formed through the lower and upper molds 16, 17 so that hot air supplied to the upper mold 17 circulates in the fabrication mold 15 and through the feather mass M containing the feathers 11. The circulation of hot air is carried out at a temperature of 40° to 50° C. for a time of 5 to 10 minutes, thereby evaporating water on the feathers 11 and hardening the polyurethane resin prepolymer. Thus, the feather containing resilient body 3 is produced.

Figure 3:
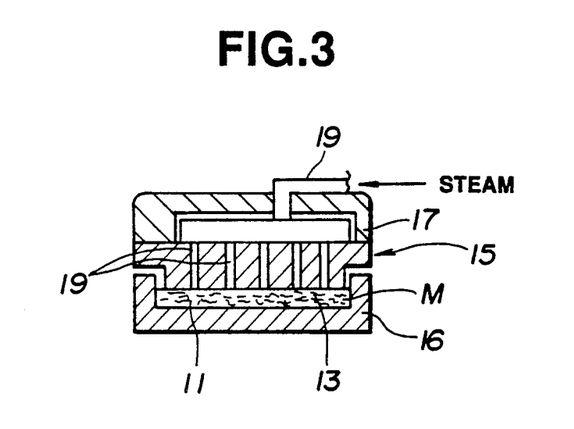
FIG. 3 is a vertical sectional view of a fabrication mold used in a third embodiment of the method of producing the feather containing resilient body, in accordance with the present invention.

FIG. 3 illustrates an essential part of a third embodiment of the production method of the feather containing resilient body 3, in accordance with the present invention. This production method is similar to the first embodiment except for production steps after the feathers 11 coated with the prepolymer 13 and water 12 in the mixing vessel 5b is poured into the fabrication mold 15 and located between the lower and upper molds 16, 17. The upper mold 17 of this fabrication mold 15 is formed with steam circulation passages 19, so that steam supplied to the upper mold 17 is introduced to the feather mass M thereby hardening the polyurethane resin prepolymer 13 coated on the feather 11. Thus, the feather containing resilient body 3 is produced. It will be understood that the features 11 coated only with the prepolymer 13 may be poured into the fabrication mold 15 to be supplied with stream of water.

An example of the feather containing resilient body 1 by this production method is formed using 100 g of the feather, 80 g of polyurethane resin prepolymer, 80 g of water steam (upon being converted to water), 300 g of methylene chloride as a diluent. The supply of stream is carried out for about 1 minute. After the supply of steam, the feather mass M is dried at a water removing process, thereby obtaining the feather containing resilient body 3 having a thickness of 20 mm.

Figure 4:
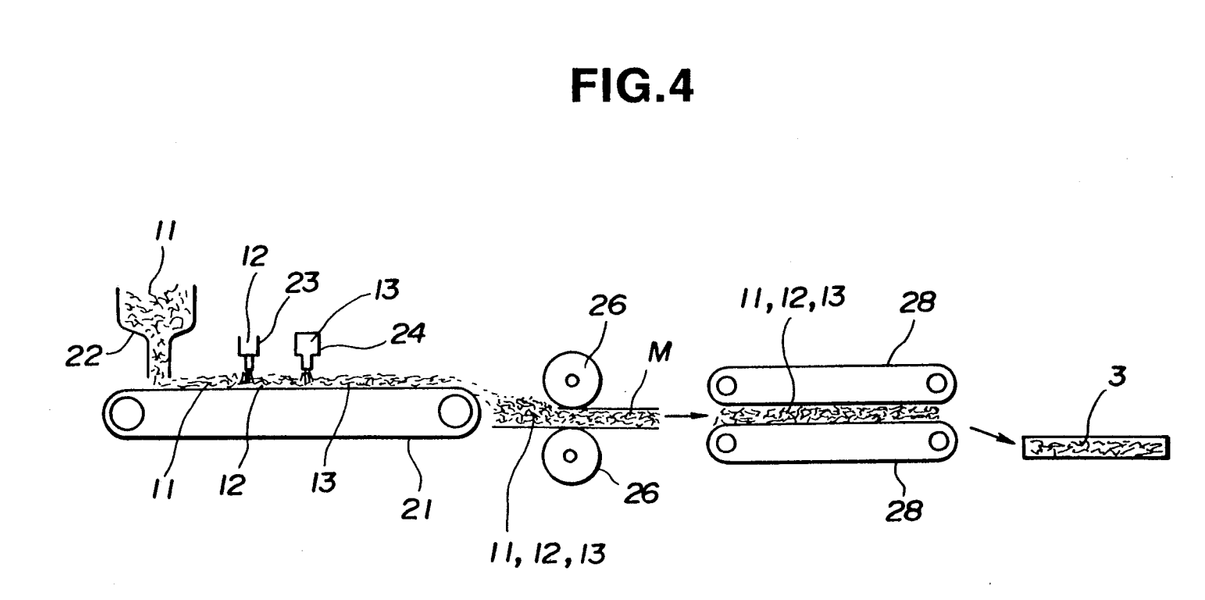
FIG. 4 is a schematic illustration of a fourth embodiment of the method of producing the feather containing resilient body, in accordance with the present invention.

FIG. 4 illustrates a fourth embodiment of the production method of the feather containing resilient body 3, in accordance with the present invention. This method uses a production apparatus including a feather supply device 22, a water supply device 23 and a polyurethane resin prepolymer supply device 24 which are disposed above the upstream side of a belt conveyer 21. Accordingly, water 12 and the polyurethane resin prepolymer 13 are applied onto the feather 11 on the upstream side of the belt conveyer 21. A pair of vertically arranged thickness adjusting rollers 26, 26 are disposed on the immediately downstream side of the downstream end of the belt conveyer 21. The feather 11 to which water 12 and the prepolymer have been applied is passed through a space between the thickness adjusting rollers 26, 26 so that the thickness and the apparent density of the feather 11 with water and the prepolymer 13 are adjusted.

Subsequently, the feather 11 with water and the prepolymer 13 is transferred to between a pair of belt conveyers 28, 28. The feather 11 between the belt conveyers 28, 28 is subjected to hot air stream at 40° to 50° C. for 5 to 10 minutes, so that drying and hardening of the polyurethane resin prepolymer are made. Thus, the feather containing resilient body 3 is formed. It will be understood that an air suction device (not shown) may disposed to suck air around the conveyer 21 so as to prevent the feather 11 from being scattered into ambient air.

Figures 5A, 5B, 5C:
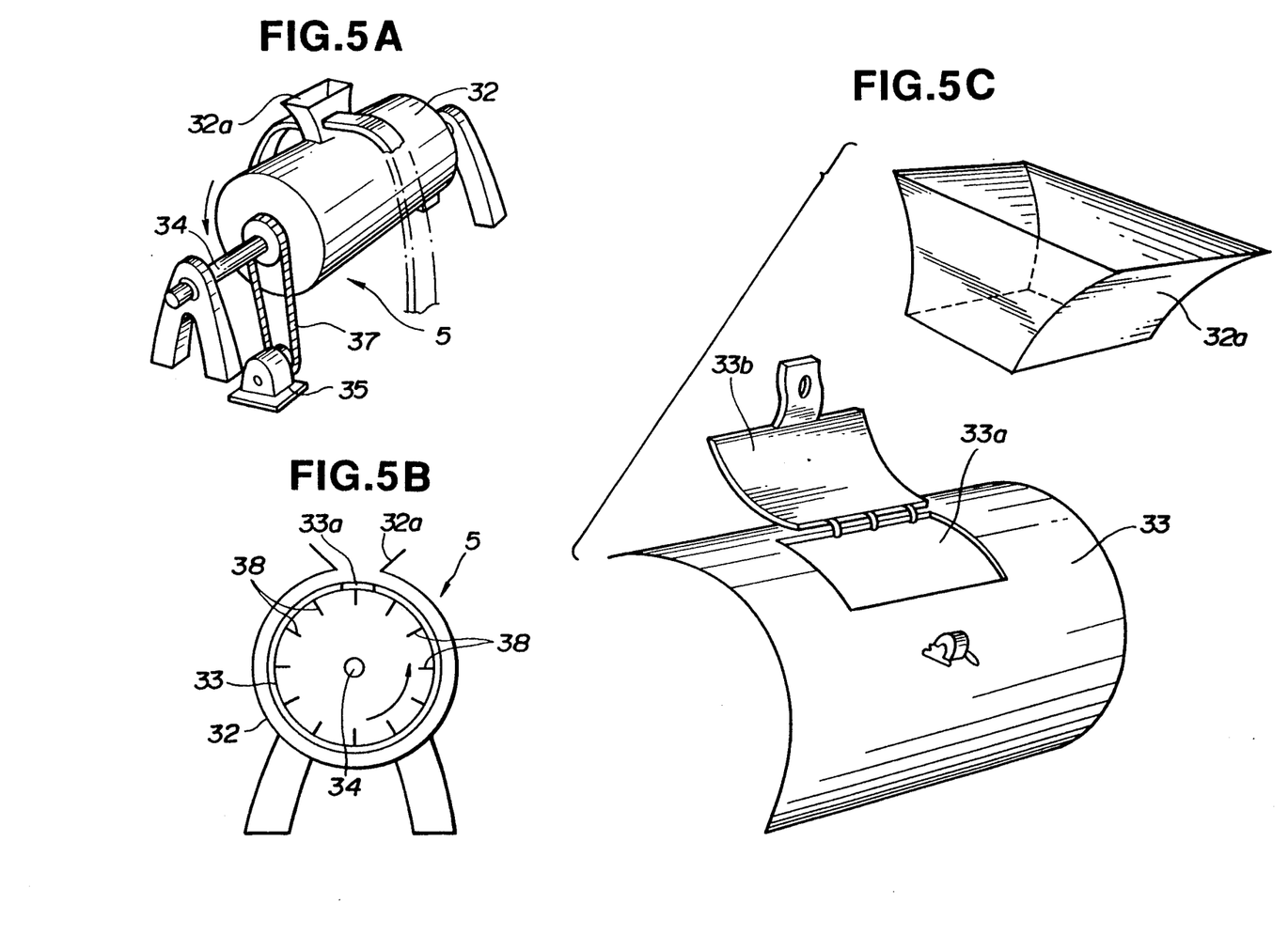
FIG. 5A is a perspective view of an example of a mixing device used in the resilient body producing method of the present invention.
FIG. 5B is a schematic sectional view of the mixing device of FIG. 5A.
FIG. 5C is a fragmentary enlarged view of a part of the mixing device of FIG. 5A.

FIGS. 5A to 5C illustrates an example of the mixing device 5 to be used in the first, second and third embodiments of the production method of the present invention. The mixing device 5 is arranged to mix the feather 11, the polyurethane resin prepolymer 13 and water 12 with each other. This mixing device 5 includes a stationary outer cylinder 32. A rotating drum 33 is rotatably disposed inside the outer cylinder 32. The rotating drum 33 is mounted on a rotating shaft 34 which is connected through a power transmission belt 37 with the output shaft of an electric motor 35, so that the rotating drum 33 is rotated upon driving of the motor 35. A plurality of baffle plates 38 are formed at the inner surface of the rotating drum 33.

With this arrangement, the feather 11 is supplied into the rotating drum 33 through supply inlets 32a, 33a which are respectively formed at the upper part of the outer cylinder 32 and the cylindrical wall of the rotating drum 33. A lid member 33b is provided near the supply inlet 33a of the rotating drum 33 so as to close the supply inlet 33a, as shown in FIG. 5C. It will be understood that supply of a predetermined amount of the feather 11 is carried out upon making the supply inlet 33a of the rotating drum 33 in agreement with the supply inlet 32a of the outer cylinder 32.

Subsequently, either one (for example, the polyurethane resin prepolymer 13) of predetermined amounts of the respective polyurethane resin prepolymer 13 and water 12 is previously supplied into the rotating drum 33 and uniformly mixed with the feather 11. Then, rotation of the rotating drum 33 is temporarily stopped, upon which a predetermined amount of water 12 is supplied to the mixture of the feather 11 and the polyurethane resin prepolymer 13. Thereafter, the rotating drum 33 is again rotated so as to homogeneously mix the mixture and water thereby to form a homogeneous mixture. This homogeneous mixture of the feather 11, the polyurethane resin prepolymer 13 and water 12 is poured into the lower mold 16 of the fabrication mold 15. The upper mold 17 is fitted in the upper mold 16 so as to adjust the thickness of the mixture. Thereafter, the mixture is dried to harden the prepolymer 13 of polyurethane resin thereby forming the feather containing resilient body 3. It will be understood that the homogeneous mixture may be supplied into the hot air circulation type fabrication mold 15 to accomplish drying of the mixture and hardening of the polyurethane resin prepolymer 13.

Figures 6A, 6B, 6C:
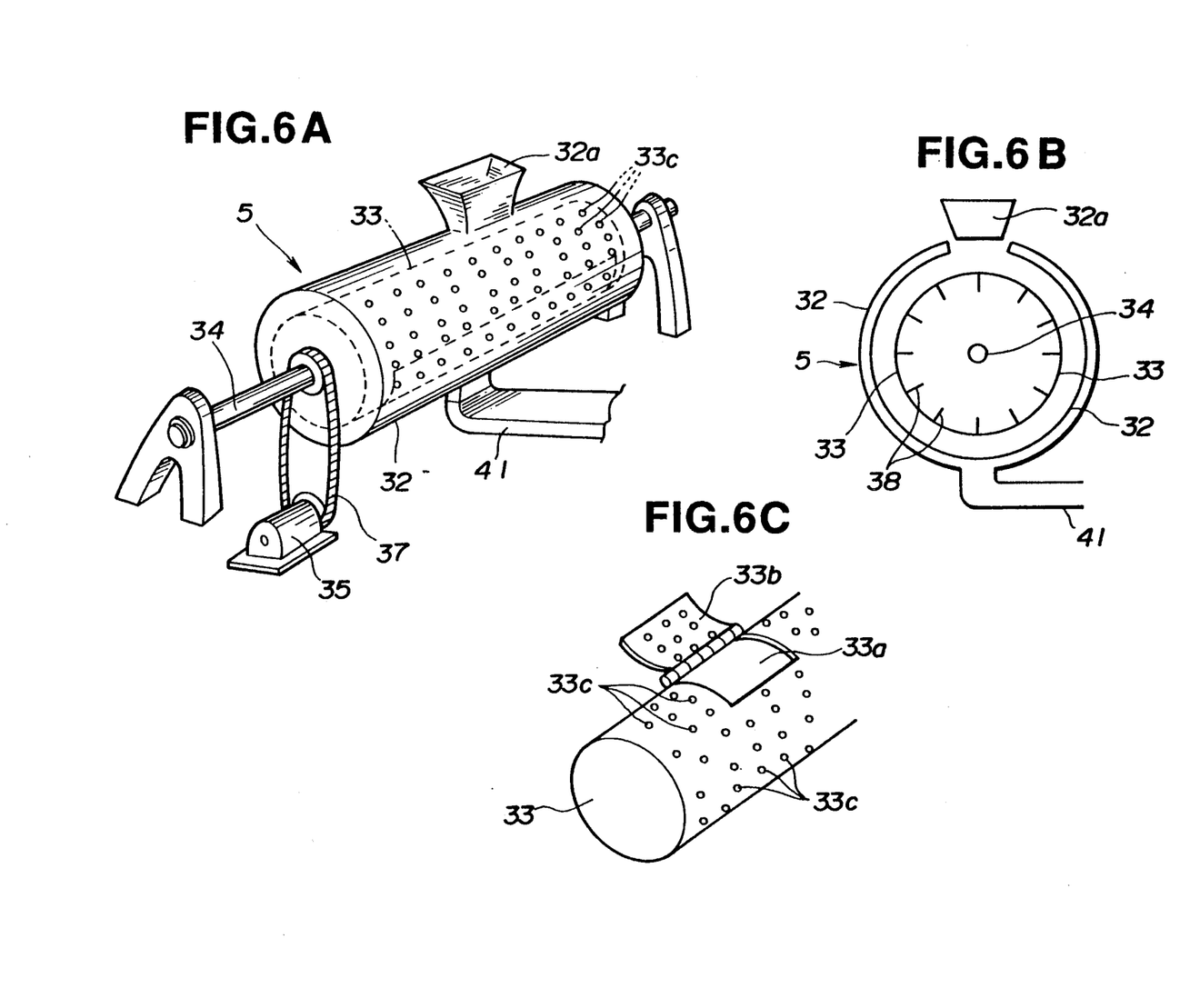
FIG. 6A is a perspective view of an another example of the mixing device used in the resilient body producing method of the present invention.
FIG. 6B is a schematic sectional view of the mixing device of FIG. 6A.
FIG. 6C is a fragmentary sectional view of a part of the mixing device of FIG. 6A.

FIGS. 6A to 6C illustrate another example of the mixing device 5 which is similar to that of FIGS. 5A to 5C. In this example, the rotating drum 33 is formed at its cylindrical wall with a plurality of small openings 33c. An air supply pipe 41 is connected at its one end to the outer cylinder 32 and at the other end thereof with an air supply source (not shown), so that air is supplied under pressure to a space between the outer cylinder 32 and the rotating drum 33. The thus supplied air is introduced into the rotating drum 33 through the small openings 33c of the rotating drum 33. As a result, the feathers 11 are homogeneously mixed with the polyurethane resin prepolymer 13 and water 12. It will be appreciated that the rotating shaft 34 of the rotating drum 33 may be formed hollow and axially piercing the inside of the rotating drum 33, in which the polyurethane resin prepolymer 13 and water 12 can be directly supplied into the rotating drum 33 through the hollow of the rotating shaft 34.

Figure 7A:
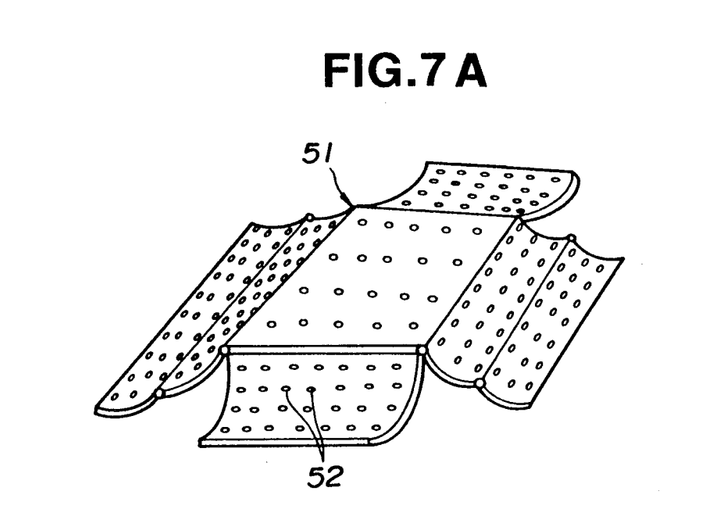
Figure 7B:
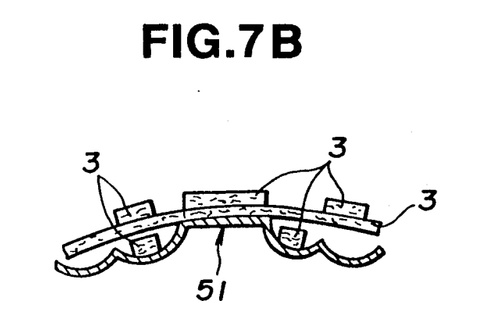
Figure 7C:
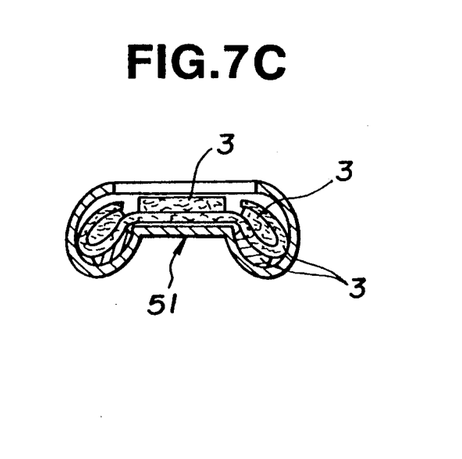

FIGS. 7A to 7D illustrate a process of forming a padding 55 of the vehicular seat of the feather containing resilient body 3 obtained by the above discussed production methods. That is, a plurality of the block shaped resilient bodies 3 are put on a fabrication mold 51 which is in its open state as shown in FIGS. 7A and 7B. The fabrication mold 51 has, in its closed state, a shape corresponding to that of the resultant seat padding 55 as shown in FIG. 7C. The fabrication mold 51 is formed of a plurality of solid parts (no numerals) each of which is formed with a plurality of openings 52. The respective solid parts are movably connected with each other to form the openable fabrication mold 51. After the block shaped resilient bodies 3 are put on the opened fabrication mold 51, the mold 51 is closed and heated to dry the resilient bodies 3 and to harden the polyurethane resin prepolymer 13.

It is preferable that the resilient body 3 to be used in this fabrication mold 51 is in its state before completing the thickness adjustment (for example, at the step shown in FIG. 1E) or in its state after the completion of the thickness adjustment and before drying and hardening of the polyurethane resin prepolymer. In such a case, a plurality of block-shaped resilient bodies 3 and a band-shaped resilient body 3 are inserted in the fabrication mold 51 as shown in FIG. 7B, and then the mold 51 is closed. At this time, water evaporates through the small openings 52 of the fabrication mold 51 so that drying of the resilient body 3 is made to accomplish hardening of the polyurethane resin prepolymer 13, thereby obtaining the vehicular seat padding 55 as shown in FIG. 7D.

Figure 7D:
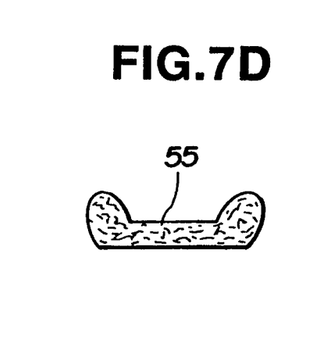

It will be appreciated that the shape of a resultant structure formed by using the fabrication mold 51 is not limited to one shown in FIG. 7D and therefore can be varied in accordance with requirements. Additionally, the mixture of the feathers 11, water 12 and the polyurethane resin prepolymer 13 may be directly supplied into the fabrication mold 51.

What is claimed is:

1. A method of producing a feather containing resilient body, comprising the steps of:

uniformly coating a predetermined amount of feathers with water;

uniformly coating the predetermined amount of feathers with prepolymer of polyurethane resin to form a mass of feather;

adjusting the thickness of said feather mass; and hardening said polyurethane resin prepolymer in said feather mass upon adjusting said feather mass thickness.

2. A method as claimed in claim 1, further comprising the step of putting said feather mass into a mold.

3. A method as claimed in claim 2, wherein said thickness adjusting step is carried out in said mold.

4. A method as claimed in claim 3, wherein the hardening step includes applying hot air onto said feather mass within said mold.

5. A method as claimed in claim 1, wherein the hardening step includes applying steam onto said feather mass within said mold, the steam applying step serving as the water coating step.

6. A method as claimed in claim 1, wherein the water coating step includes supplying said feathers into a mixing device in which said feather is stirred, and supplying water into the mixing device under a stirring condition of said feather.

7. A method as claimed in claim 6, wherein the polyurethane resin prepolymer coating step includes supplying said feather into a mixing device in which said feather is stirred, and supplying the polyurethane resin prepolymer into the mixing device under the stirring condition of said feather.

8. A method as claimed in claim 6, wherein said mixing device is a rotatable drum into which said feather is supplied.

* * * * *